US007580160B2

(12) United States Patent
Tokuda

(10) Patent No.: US 7,580,160 B2

(45) Date of Patent: Aug. 25, 2009

(54) MODEM AND FACSIMILE APPARATUS CAPABLE OF MONITORING G3 COMMUNICATIONS VIA ISDN

(75) Inventor: Masashi Tokuda, Kanagawa-ken (JP)

(73) Assignee: Ricoh Company, Ltd., Tokyo (JP)

(*) Notice: Subject to any disclaimer, the term of this patent is extended or adjusted under 35 U.S.C. 154(b) by 665 days.

(21) Appl. No.: 10/763,707

(22) Filed: Jan. 22, 2004

(65) Prior Publication Data

US 2004/0246530 A1 Dec. 9, 2004

(30) Foreign Application Priority Data

Jan. 24, 2003 (JP) ............................ 2003-015532

(51) Int. Cl.
*H04N 1/32* (2006.01)
*H04M 11/00* (2006.01)

(52) U.S. Cl. ...................... 358/442; 358/1.15; 358/400; 358/426.16; 358/441; 358/443; 358/468; 379/412; 379/93.05

(58) Field of Classification Search ................. 358/442, 358/443, 445, 446, 463, 468
See application file for complete search history.

(56) References Cited

U.S. PATENT DOCUMENTS 5,142,568 A * 8/1992 Ogata et al. ............ 379/100.13
5,418,625 A * 5/1995 Shimoosawa ............... 358/442
5,502,752 A * 3/1996 Averbuch et al. ............ 375/377
5,598,401 A * 1/1997 Blackwell et al. ........... 370/385
5,719,688 A * 2/1998 Kagami ...................... 358/468
5,861,824 A 1/1999 Ryu et al.
6,181,736 B1 * 1/2001 McLaughlin et al. ........ 375/222
6,351,530 B1 * 2/2002 Rahamim et al. ...... 379/399.01
6,711,245 B1 * 3/2004 Mardinian et al. ....... 379/93.28
7,139,104 B2 * 11/2006 Okabe ........................ 358/400
7,330,544 B2 * 2/2008 D'Angelo et al. ...... 379/399.01
2003/0048483 A1 * 3/2003 Okabe ........................ 358/400
2003/0179818 A1 * 9/2003 D'Angelo et al. ........... 375/222

* cited by examiner

*Primary Examiner*—King Y Poon
*Assistant Examiner*—Richard Z Zhu
(74) *Attorney, Agent, or Firm*—Cooper & Dunham, LLP

(57) ABSTRACT

A facsimile use modem apparatus includes an analog interface formed from a silicon data access arrangement interfacing with an analog telephone line. A digital interface is provided to interface with an ISDN line. A signal converting device is provided to convert a modem signal used in facsimile communications via the analog telephone line into a signal used in the ISDN line, vice a versa. A data transmitting device is provided to transmit linear data to a monitor via the silicon data access arrangement when G3 facsimile communications are performed via the ISDN line so as to monitor a progress of the G3 facsimile communications.

19 Claims, 5 Drawing Sheets

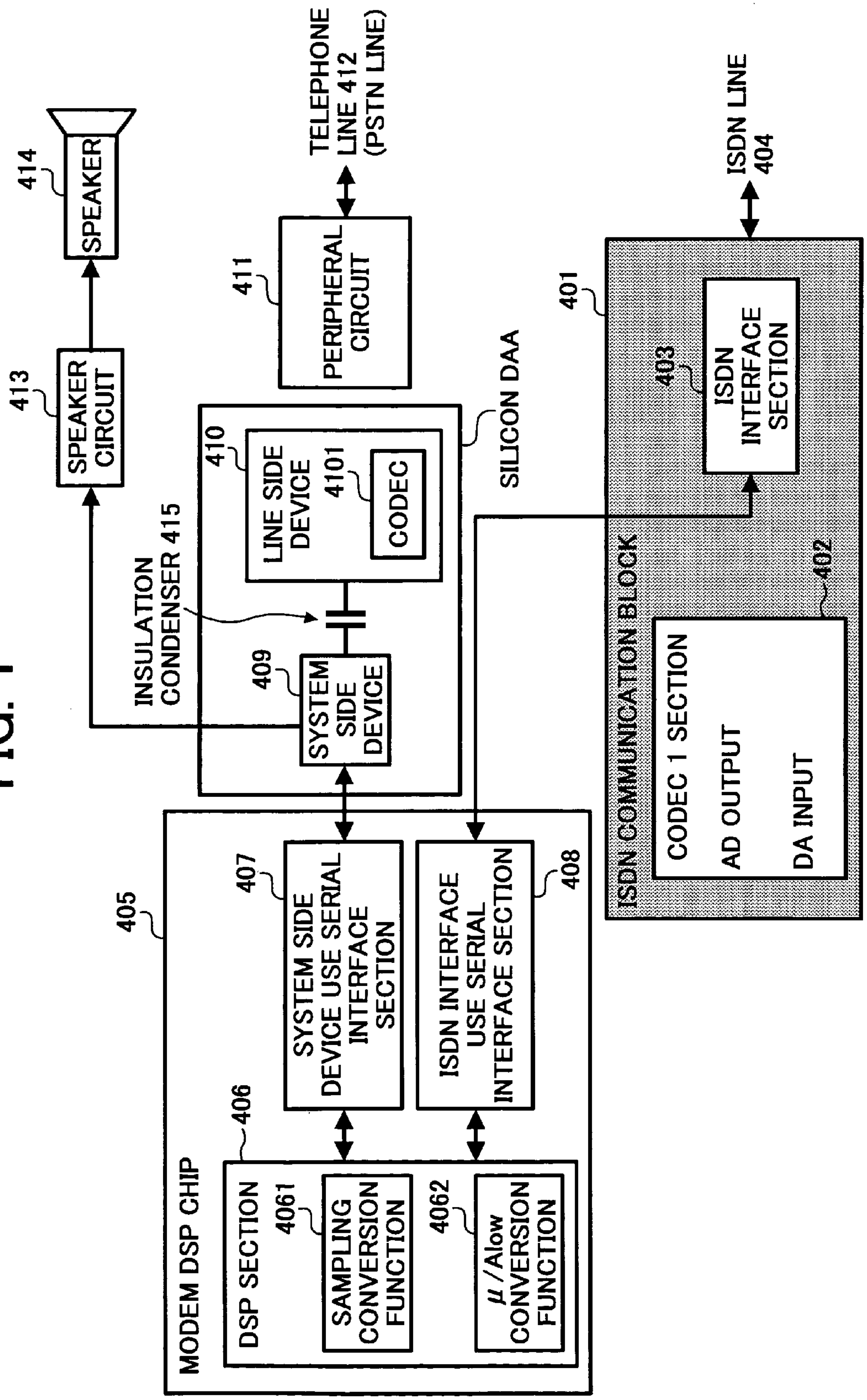
FIG. 1
SPEAKER
414
SPEAKER CIRCUIT
413
TELEPHONE LINE 412 (PSTN LINE)
PERIPHERAL CIRCUIT
411
ISDN LINE 404
401
ISDN INTERFACE SECTION
403
SILICON DAA
LINE SIDE DEVICE
410
4101
CODEC
INSULATION CONDENSER 415
SYSTEM SIDE DEVICE
409
ISDN COMMUNICATION BLOCK
CODEC 1 SECTION
AD OUTPUT
DA INPUT
402
405
SYSTEM SIDE DEVICE USE SERIAL INTERFACE SECTION
407
ISDN INTERFACE USE SERIAL INTERFACE SECTION
408
406
MODEM DSP CHIP
DSP SECTION
4061
SAMPLING CONVERSION FUNCTION
4062
μ/Alow CONVERSION FUNCTION ADDITION AMPLIFIER 209
207
SPEAKER
TO NCU SECTION
ISDN LINE 204
208
SW1
201
203
ISDN INTERFACE SECTION
202
CODEC 1 SECTION
AD OUTPUT
DA INPUT
206
CODEC 0 SECTION
AD OUTPUT
DA INPUT
205
MODEM DSP SECTION

MODEM AND FACSIMILE APPARATUS CAPABLE OF MONITORING G3 COMMUNICATIONS VIA ISDN

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field

The present specification relates generally to modems and facsimile apparatuses which execute G3 and G4 facsimile communications through telephone and ISDN lines, and in particular to such modems and facsimile apparatuses which employ a silicon DAA (Data Access Arrangement) circuit capable of monitoring G3 communications executed via the ISDN.

2. Discussion of Related Art

A conventional electric circuit forming a central core of a facsimile apparatus can generally be categorized into an FCU (facsimile control unit) and an NCU (network control unit) as shown in FIG. 3.

The FCU 101 includes a controller section 102 which controls various instruments built in a facsimile and a modem section which applies modulation/demodulation to a facsimile signal. The modem section typically includes a modem DSP (Digital Signal Processor) 103 performing digital signal processing. Also included in the modem section is an AFE (Analog Front End) section 104 having a CODEC (Compression/Decompression) which performs AD/DA conversions and an operational amplifier which adjusts a facsimile signal to a specified level.

The NCU 105 interfaces with a telephone line and is formed from an insulation transformer 106 which insulates the telephone line 109 (hereinafter referred to as a primary side) from the FCU 101 (hereinafter referred to as a secondary side), a direct current circuit 107 which meets a direct current closure standard for the telephone line, and a ring detection circuit 108 which detects a ring signal of the telephone line and so on.

As a facsimile communications system, widely spreading G (Group) 3 communications and high-speed G4 digital communications operating via an ISDN line are exemplified. According to the G3 communications system, a transmission modem temporarily converts a digital signal into an analog signal and then transmits the analog signal through a telephone line, and a reception modem converts the analog signal into digital data. In contrast, the G4 communications system transmits a digital signal as is via the ISDN line.

Such communications are performed without any problem between communication systems of the same type. However, due to a difference in a type of a communications system, a G3 facsimile apparatus and G4 a facsimile apparatus cannot communicate with each other unless one or both of them are adapted for such communication. For example, a facsimile apparatus having a function of G4 communications can include a G3 communications function in order to communicate with a facsimile apparatus operating in the G3 system. In such a situation, however, although a user installs and connects the IDSN line to his or her G4 facsimile apparatus, a communications counterpart is limited to a G3 facsimile apparatus when the G4 facsimile apparatus performs communications in a G3 mode via the ISDN line as shown in FIG. 4.

Specifically, facsimile signals input and output to and from the modem DSP 205 undergo AD/DA conversion in the CODEC0 section 206. When communications are performed via a conventional PSTN (Public Switched Telephone Network), input and output terminals of the CODEC0 section 206 are connected to the NCU and the PSTN line via an insulation transformer. Input and output signals to and from the CODEC0 section 206 are mixed in the addition amplifier 209 and are output from a speaker 207 as a mixture signal generating a sound. Thus, a facsimile signal on the PSTN line can be aurally monitored.

On the other hand, when facsimile communications are performed via the ISDN line, an SW1 section 208 switches a connection destination of the input and output terminals of the CODEC0 section 206 from the NCU to the CODEC1 section 202. The CODEC1 section 202 converts a facsimile communications signal transmitted from the CODEC0 section 206 into a digital signal of 8 bits having undergone μ/Alaw or μ/law conversion communicable at 8000 Hz sampling frequencies for the ISDN line. Such digital signal is then launched into the ISDN line via an ISDN interface section 203. Similar to the PSTN line connection, a facsimile signal on the ISDN line can be aurally monitored from the speaker 207.

It is increasingly the case recently that in such an environment, data modems employ a low cost and downsized silicon DAA (Data Access Arrangement) instead of using the above-mentioned transformer. With such a configuration, a problem which likely occurs in such a facsimile is that the G3 facsimile communications cannot successfully be performed via the ISDN. A countermeasure against the problem has been developed such that digital data subjected to sampling rate conversion to 8000 Hz and μ/Alaw or μ/law conversion is used to communicate between the data modem and the ISDN line.

Further, as an insulation device insulating the FCU from the telephone (PSTN) line, an NCU employing an insulation transformer is conventionally adopted. It is increasingly common, however, that data modem apparatuses employ a silicon DAA having an insulation device such as a condenser. Thus, it is more common now that a facsimile apparatus will use a silicon DAA as shown in FIG. 5.

Specifically, the silicon DAA utilizes such an insulation condition of a condenser and is typically formed from a system side device 305 and a line side device 307 coupled through the insulation condenser 310. In such a facsimile apparatus, a facsimile communications signal from the modem DSP section 304 is converted into a signal capable of passing through the insulation condenser 310 from the system side device 305, to the line side device 307. The line side device 307 converts the signal from the modem DSP 304 with a built-in CODEC section 3071 and outputs an analog signal to a line. In contrast, an input signal received via the PSTN line undergoes A/D conversion in the built-in CODEC section 3071, and is transmitted to the system side device 305 via the insulation condenser 310, which is ultimately input to the modem DSP 304.

However, when facsimile communications are performed via the ISDN line from the conventional system of FIG. 3 employing the silicon DAA, the ISDN communications block of FIG. 4 must be connected to the system. As a result, the input to and output from the ISDN communications block are enough to directly communicate with the CODEC1 section 202, and accordingly, the system of the silicon DAA has no provision (i.e., data communication route) to transmit a facsimile communications signal to a system side device 305 of the secondary side connecting to a speaker.

Further, due to an 8 bits and μ/Alaw or μ/law conversion receiving digital signal communicable at 8000 Hz through the ISDN line, the above-mentioned facsimile communications signal cannot be monitored through the speaker if such a format is maintained. That is, these inputs to and outputs from the modem DSP 304 and the system side device 305 are entirely digital signal states, and there are no analog signals for driving the speaker.

SUMMARY

The present disclosure provides various examples and embodiments of a new modem and facsimile apparatus capable of monitoring G3 facsimile communications through an ISDN line.

In an aspect of this disclosure, a novel modem (and facsimile apparatus) is provided which includes an analog interface formed from a silicon data access arrangement operative to interface with an analog telephone line, a digital interface operative to interface with the ISDN line, and a converting device which converts a modem signal communicated via the analog telephone line into a signal communicated via the ISDN line, vice a versa.

In a preferred embodiment, a transmitting device transmits linear digital signals to a speaker via the silicon data access arrangement when G3 facsimile communications are performed through the ISDN line in order to aurally monitor a progress of the G3 facsimile communications.

In another exemplary embodiment, the speaker driving use signal is generated by combining facsimile sending and reception signals.

In yet another exemplary embodiment, a volume adjusting device is provided to multiply each of the facsimile sending and reception signals by a prescribed gain and adjust a volume of the speaker using calculation resulting data.

In yet another exemplary embodiment, a data canceling device is provided to cancel excessive facsimile communications data when a sampling frequency of the facsimile reception signal from the ISDN line is higher than that of the modem.

In yet another exemplary embodiment, a noise suppressing device is provided to suppress noises likely generated by the speaker by repeatedly using the same sampling data when the sampling frequency of the facsimile reception data is lower than that of the modem.

In yet another exemplary embodiment, the silicon data access arrangement, speaker, and ISDN interface collectively forms a network control unit of the facsimile.

BRIEF DESCRIPTION OF DRAWINGS

A more complete appreciation of the present disclosure and many of the attendant advantages thereof can be more readily understood from the following detailed description when considered in connection with the accompanying drawings, wherein:

FIG. 1 illustrates an exemplary facsimile use modem apparatus in accordance with a preferred embodiment of the present invention;

PREFERRED EMBODIMENT OF THE PRESENT INVENTION

Figure 2:
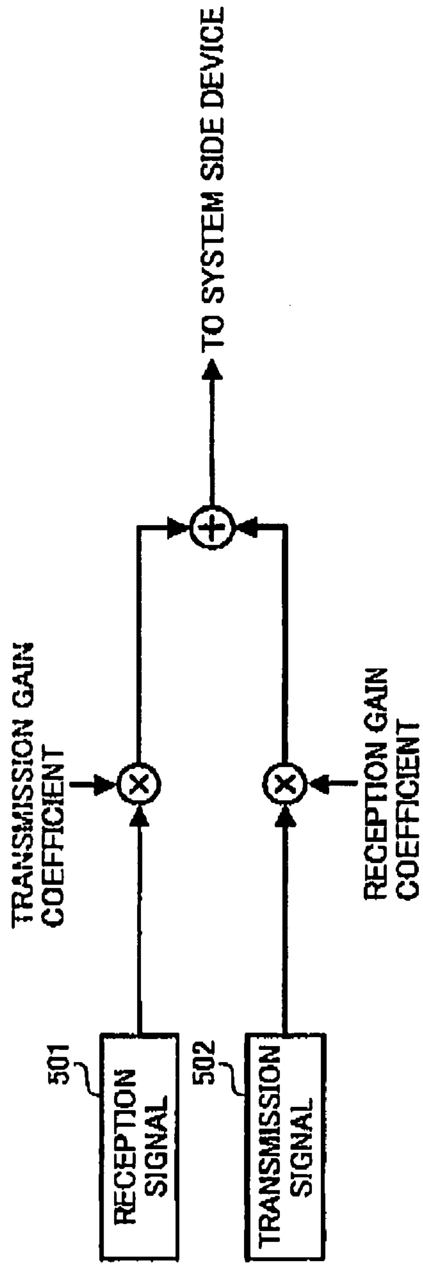
FIG. 2 illustrates an exemplary speaker circuit, according to a preferred embodiment of the present invention.
Figure 3:
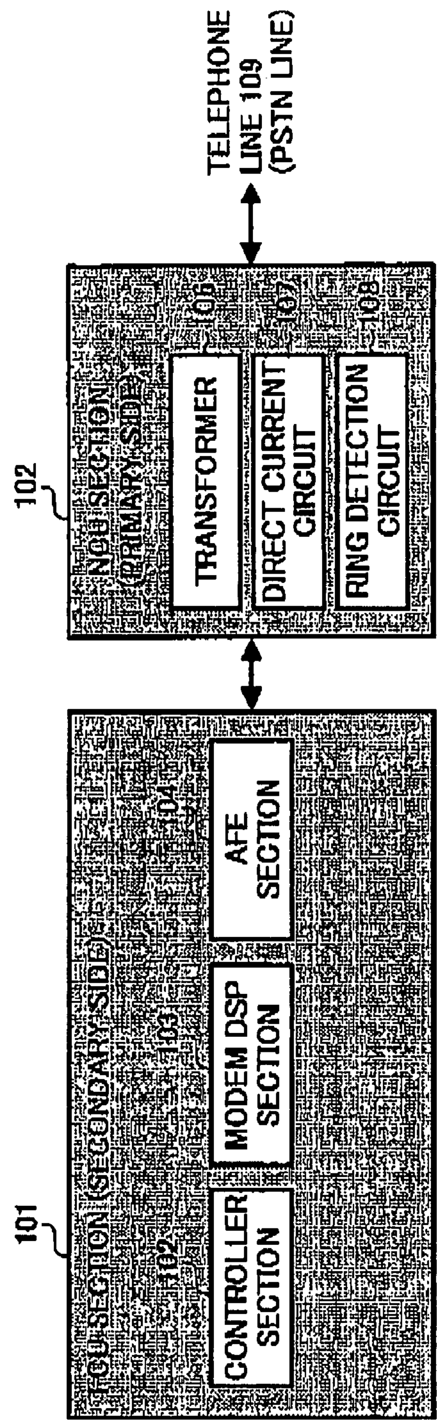
FIG. 3 illustrates a conventional electric circuit forming a central core of a facsimile apparatus.
Figure 4:
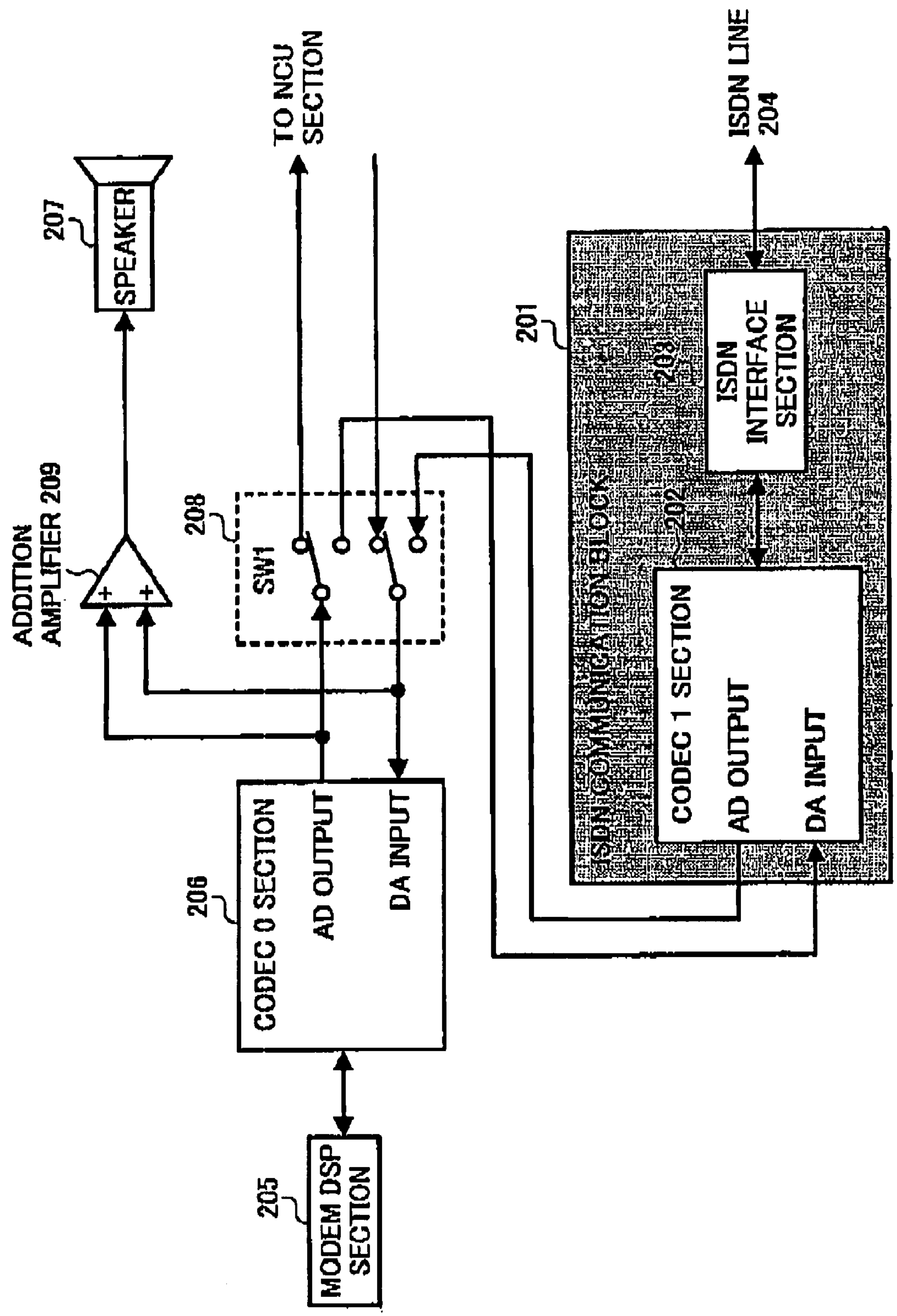
FIG. 4 illustrates a conventional connection between an ISDN line and a facsimile apparatus provided with G3 and G4 functions.
Figure 5:
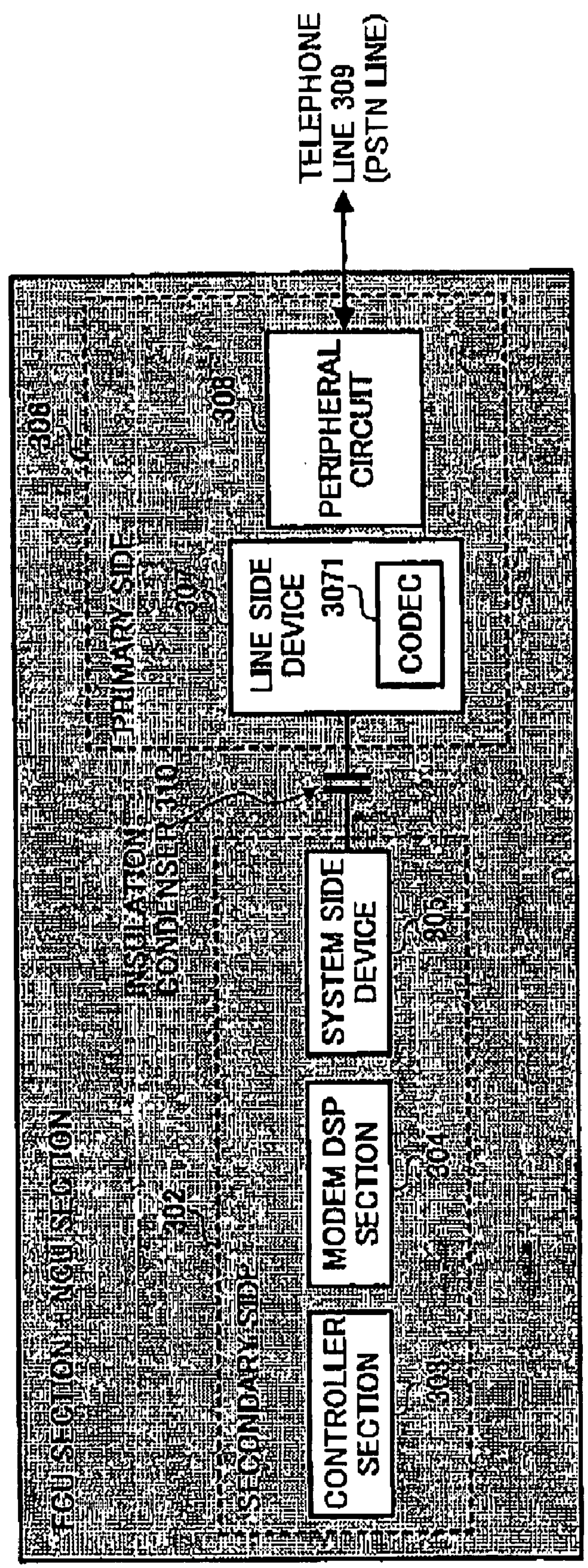
FIG. 5 schematically illustrates FCU and NCN sections formed from a silicon DAA.

A description of some exemplary embodiments is provided below with reference to the drawings, wherein like reference numerals designate identical or corresponding parts throughout several views.

In particular in FIG. 1, a modem DSP chip 405 (i.e., a modem DSP section) is formed from, but is not limited to, a DSP section 406 which applies modulation and demodulation processes to a facsimile signal using a digitizing process, a serial interface section 407 which performs serial data communications with a system side device 409 formed from, but is not limited to, a silicon DAA, and a serial interface section 408 performing serial data communications with an ISDN interface section 403.

When facsimile communications are performed with a PSTN line 412, communications data (for example, a facsimile signal) from the DSP section 406 may be converted into a prescribed interface format by the serial interface section 407 to be used in the modem CODEC 4101. Such an interface format may include a linear data of 16 bit length communicable at various sampling frequencies in accordance with a connection phase and/or a symbol rate.

A system side device 409 can handle the interface format, and converts a facsimile signal (for example, communication data) transmitted from the DSP section 406 into a signal capable of passing through the insulation condenser 415. The facsimile signal transmitted through the insulation condenser 415 is launched into the PSTN line as an analog signal through the line side device 410. The system side device 409 preferably includes an analog output terminal connected to a speaker 414 and is designed to monitor a communications condition on the PSTN line if equipped with some amount of analog circuits.

When facsimile communications are performed with the ISDN line, communications data from the DSP section 406 having 16 bits linear data communicable at various sampling frequencies in accordance with a connection phase and/or a symbol rate may be converted into an interface format formed from an 8 bits μ/Alaw or μ/law data communicable at 8000 Hz sampling frequencies by a serial interface section 408 to be used in the ISDN interface.

Specifically, the sampling frequency of the communications data from the DSP section 406 may be converted into 8000 Hz from an original sampling frequency such as 9600 Hz, 7200 Hz, etc., by a sampling conversion function 4061. The μ/Alaw or μ/law conversion function 4062 may convert the 16 bit linear data into an 8 bit μ/Alaw or μ/law data format.

The data converted in such a manner is then transmitted to an ISDN interface section 403 by the interface section 408 and is launched into the ISDN line after being converted into a prescribed condition meeting the ISDN standard.

In such a system, when G3 communications are performed via the ISDN line, since a signal expected to exit thereto in an analog state is still the 8 bits and μ/Alaw or μ/law data format, a user cannot confirm a communications condition on the ISDN line in accordance with a sound if such a format is maintained.

Figure 6A:
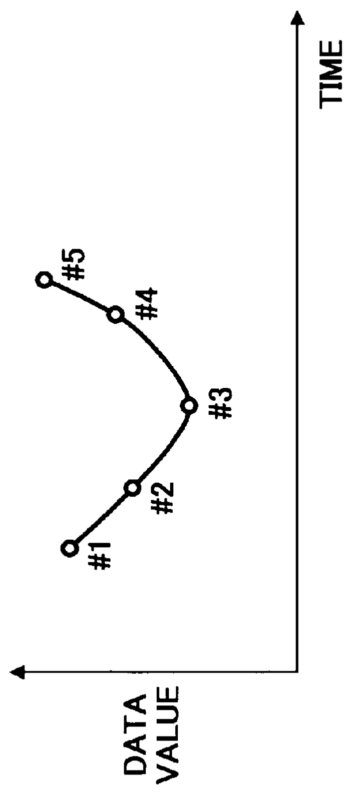
FIGS. 6A and 6B illustrate linear data transmitted to the speaker of the preferred embodiment of the present invention.

According to the preferred embodiment of the present invention, linear data generated in the modem DSP 406 as shown in FIG. 6A is preferably given, as is, to the silicon DAA not operating during the G3 communications, which is directly performed via the ISDN line detouring the system side device 409. The linear data may then be transmitted to the speaker via the analog output terminal of the silicon DAA.

Further, the transmission signal is the digital linear data not subjected to the μ/Alaw or μ/law conversion in the modem DSP 406 as mentioned above, and a reception signal of μ/Alaw or μ/law data is converted into linear data when demodulated by the modem DSP. Hence, if summing and transmitting the above-mentioned transmission and reception linear data to the speaker via the analog output terminal, a sound can be generated (and heard) in both directions. Stated differently, even during G3 communications via the ISDN, a line signal representing a communications condition can similarly be monitored by a user, when the facsimile communications are performed via the conventional analog line, if a μ/Alaw or μ/law signal flowing though the ISDN line at 8000 Hz is converted into PCM data to be transmitted to the speaker via the silicon DAA. Thus, such a silicon DAA and speaker circuit can form the NCU of the modem apparatus of the facsimile according to the preferred embodiment of the present invention.

An other embodiment of a speaker circuit is now described with reference to FIG. 2. The speaker circuit occasionally needs sound volume adjustment depending upon a type of its parts and circuit configuration. The speaker circuit preferably entails a system multiplying the above-mentioned linear data by a gain on the DSP side before the product is sent to the silicon DAA. Specifically, each of the transmission and reception signals is preferably multiplied by the gain, and the product of such calculation is preferably sent to the system side device. If a gain is preset to the DSP section 406 by a controller, a system designer can set an optimum level to the speaker circuit.

Further, when a speaker monitors G3 communications executed via the ISDN in the above-mentioned manner, clock deviation likely occurs as a problem. Specifically, when the G3 communications are performed via the ISDN, a sampling frequency used in a silicon DAA is generally set to a suitable level for the modem to operate, such as 7200 Hz, 9600 Hz, etc., as in its ordinary operation. Thus, since a sampling frequency used in the ISDN is generally 8000 Hz, the sampling frequency of the ISDN is attempted to undergo the sampling conversion so as to synchronize with that of the modem clock.

Some deviation, nevertheless, may remain there between. That is because communication data flows through the ISDN line at a prescribed frequency of 8000 Hz, and the silicon DAA generates sampling clocks by dividing a master clock transmitted thereto. In short, these clocks can originate from different sources.

Further, a sampling clock having a fine frequency such as the 50 ppm level is usually employed for a silicon DAA. Deviation in a sampling frequency between the silicon DAA and the ISDN may amount to about 100 ppm, if any. For example, if the sampling frequency of the modem amounts to 9600 Hz, overs and shorts may be about 0.96 samples per second as calculated by the following formula:

$$9600 \times 100/1000000 = 0.96$$

Figure 6B:
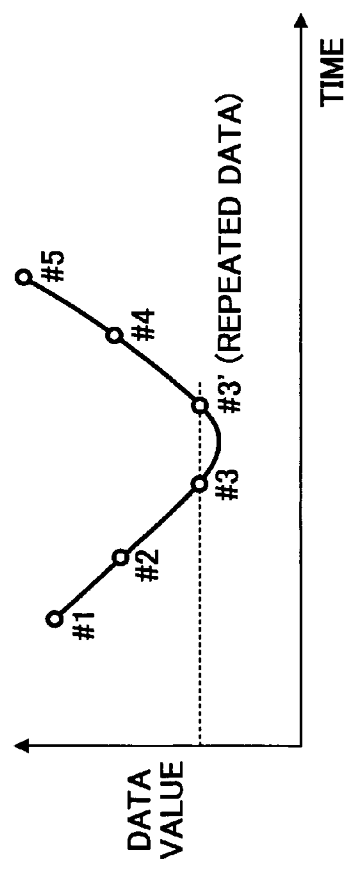

In such a situation, dropout of only a sample from communications data to and from the modem may cause deviation of phase and sampling synchronization, thereby resulting in a fatal data error during communications. Such deviation, however, may be permissible to the extent a communications condition can be heard without uncomfortable feeling when monitored by an operator via the speaker. Therefore, if such a sample is short, the same sampling data is repeatedly used as illustrated in FIG. 6B.

In contrast, if such a sample is excessive, an excessive sample may be omitted. By controlling in such a manner, the communications condition can be monitored in any cases via the speaker substantially excluding a plosive sound.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

This application claims priority under 35 U.S.C. §119 to Japanese Patent Application No. 2003-015532, filed on Jan. 24, 2003, the entire contents of which are incorporated by reference herein.

What is claimed is:

1. A facsimile use modem apparatus, comprising:

an analog interface formed from a silicon data access arrangement operative to interface with an analog telephone line, said analog interface including an insulation device configured to insulate a remainder of said facsimile use modem apparatus from said analog telephone line;

a digital interface operative to interface with an ISDN (integrated services digital network) line and configured for G3 communications through the ISDN line;

a signal converting device configured to convert a modem signal used in facsimile communications via the analog telephone line into a first signal used in the ISDN line, and convert a second signal from the ISDN line into a converted signal for use in facsimile communications via the analog telephone line;

a monitoring device located within the silicon data access arrangement and configured for monitoring a progress of the facsimile communications via the ISDN line; and a data transmitting device operative to transmit linear data to a speaker via the silicon data access arrangement;

a system side device connecting the silicon data access arrangement and the digital interface that enables transmission of signal through an insulation condenser to thereby enable said monitoring device located within the silicon data access arrangement to monitor G3 communications executed through the ISDN line.

2. The facsimile use modem apparatus according to claim 1, wherein said linear data is formed from facsimile sending data and facsimile reception data.

3. The facsimile use modem apparatus according to claim 2, further comprising a volume adjusting device configured to multiply each of the facsimile sending data and facsimile reception data by a prescribed gain when a volume of the speaker is adjusted.

4. The facsimile use modem apparatus according to claim 1, further comprising a data canceling device configured to cancel excessive facsimile communications data when a clock of the ISDN line is faster than that of the modem.

5. The facsimile use modem apparatus according to claim 4, further comprising a noise suppressing device operative to suppress noises output from the speaker by repeatedly using a previous data when the clock of the ISDN line is slower than that of the modem.

6. The facsimile use modem apparatus according to claim 2, wherein said silicon data access arrangement, speaker, and ISDN interface collectively form a network control unit of the facsimile.

7. A facsimile apparatus including a facsimile use modem comprising:

an analog interface formed from a silicon data access arrangement operative to interface with an analog telephone line, said analog interface including an insulation device configured to insulate a remainder of said facsimile use modem apparatus from said analog telephone line;

a digital interface operative to interface with an ISDN (integrated services digital network) line and configured for G3 communications through the ISDN line;

a signal converting device configured to convert a modem signal used in facsimile communications via the analog telephone line into a first signal used in the ISDN line, and convert a second signal from the ISDN line into a converted signal for use in facsimile communications via the analog telephone line;

a monitoring device located within the silicon data access arrangement and configured for monitoring a progress of the facsimile communications via the ISDN line; and a data transmitting device operative to transmit linear data to a speaker via the silicon data access arrangement;

a system side device connecting the silicon data access arrangement and the digital interface that enables transmission of signal through an insulation condenser to thereby enable said monitoring device located within the silicon data access arrangement to monitor G3 communications executed through the ISDN line.

8. A network connecting a facsimile apparatus having a facsimile use modem comprising:

an analog interface formed from a silicon data access arrangement operative to interface with an analog telephone line, said analog interface including an insulation device configured to insulate a remainder of said facsimile use modem apparatus from said analog telephone line;

a digital interface operative to interface with an ISDN (integrated services digital network) line and configured for G3 communications through the ISDN line;

a signal converting device configured to convert a modem signal used in facsimile communications via the analog telephone line into a first signal used in the ISDN line, and convert a second signal from the ISDN line into a converted signal for use in facsimile communications via the analog telephone line;

a monitoring device located within the silicon data access arrangement and configured for monitoring a progress of the facsimile communications via the ISDN line; and a data transmitting device operative to transmit linear data to a speaker via the silicon data access arrangement;

a system side device connecting the silicon data access arrangement and the digital interface that enables transmission of signal through an insulation condenser to thereby enable said monitoring device located within the silicon data access arrangement to monitor G3 communications executed through the ISDN line.

9. The facsimile use modem apparatus according to claim 1, wherein said signal converting device includes a DSP section, and said DSP section converts a facsimile transmission signal or facsimile reception signal to generate the linear data supplied to the speaker.

10. The network connecting the facsimile apparatus having the facsimile use modem according to claim 8, wherein said linear data is formed from facsimile sending data and facsimile reception data.

11. The network connecting the facsimile apparatus having the facsimile use modem according to claim 10, wherein the facsimile use modem further comprises a volume adjusting device configured to multiply each of the facsimile sending data and facsimile reception data by a prescribed gain when a volume of the speaker is adjusted.

12. The network connecting the facsimile apparatus having the facsimile use modem according to claim 8, wherein the facsimile use modem further comprises a data canceling device configured to cancel excessive facsimile communications data when a clock of the ISDN line is faster than that of the modem.

13. The network connecting the facsimile apparatus having the facsimile use modem according to claim 12, wherein the facsimile use modem further comprises a noise suppressing device operative to suppress noises output from the speaker by repeatedly using a previous data when the clock of the ISDN line is slower than that of the modem.

14. The network connecting the facsimile apparatus having the facsimile use modem according to claim 10, wherein said silicon data access arrangement, speaker, and ISDN interface collectively form a network control unit of the facsimile.

15. The facsimile apparatus having the facsimile use modem according to claim 7, wherein said linear data is formed from facsimile sending data and facsimile reception data.

16. The facsimile apparatus having the facsimile use modem according to claim 15, wherein the facsimile use modem further comprises a volume adjusting device configured to multiply each of the facsimile sending data and facsimile reception data by a prescribed gain when a volume of the speaker is adjusted.

17. The facsimile apparatus having the facsimile use modem according to claim 7, wherein the facsimile use modem further comprises a data canceling device configured to cancel excessive facsimile communications data when a clock of the ISDN line is faster than that of the modem.

18. The network connecting the facsimile apparatus having the facsimile use modem according to claim 17, wherein the facsimile use modem further comprises a noise suppressing device operative to suppress noises output from the speaker by repeatedly using a previous data when the clock of the ISDN line is slower than that of the modem.

19. The network connecting the facsimile apparatus having the facsimile use modem according to claim 15, wherein said silicon data access arrangement, speaker, and ISDN interface collectively form a network control unit of the facsimile.

* * * * *